(12) United States Patent
Justesen et al.

(10) Patent No.: US 10,293,491 B2
(45) Date of Patent: May 21, 2019

(54) AUTOMATED BIN PACKING TOOL

(71) Applicant: SOUTHERN FIELD WELDING, LLC, Burley, ID (US)

(72) Inventors: Michael Neil Justesen, Burley, ID (US); Dirk Duncan, Burley, ID (US); James Claude Murphy, Burley, ID (US)

(73) Assignee: Southern Fabrication Works, LLC, Burley, ID (US)

( * ) Notice: Subject to any disclaimer, the term of this patent is extended or adjusted under 35 U.S.C. 154(b) by 0 days.

(21) Appl. No.: 15/437,292

(22) Filed: Feb. 20, 2017

(65) Prior Publication Data

US 2018/0237235 A1  Aug. 23, 2018

(51) Int. Cl.
*B25J 15/00* (2006.01)
*B65G 47/91* (2006.01)

(52) U.S. Cl.
CPC .......... *B25J 15/0014* (2013.01); *B65G 47/91* (2013.01); *B65G 2201/0211* (2013.01); *B65G 2201/0238* (2013.01)

(58) Field of Classification Search
CPC .............................. B25J 15/0014; B65G 65/32
USPC .................................................. 198/426, 429
See application file for complete search history.

(56) References Cited

U.S. PATENT DOCUMENTS

| 4,768,642 | A | * | 9/1988 | Hunter | ................. | B65G 47/082 |
| | | | | | | 198/419.2 |
| 5,039,273 | A | * | 8/1991 | Schuhmacher | ........ | B65G 65/32 |
| | | | | | | 414/301 |
| 7,153,085 | B2 | | 12/2006 | Clark | | |
| 8,356,458 | B2 | | 1/2013 | Rubsaamen | | |
| 8,777,551 | B1 | * | 7/2014 | Widder | .................. | B65G 47/90 |
| | | | | | | 414/796.6 |
| 8,834,779 | B2 | | 9/2014 | Hahn | | |
| 9,315,337 | B2 | | 4/2016 | Cavelius | | |
| 2009/0049801 | A1 | * | 2/2009 | Hagenbrock | ........... | B65B 21/12 |
| | | | | | | 53/445 |
| 2010/0178149 | A1 | | 7/2010 | Fritzsche | | |
| 2010/0190626 | A1 | * | 7/2010 | Taketsugu | .............. | B65G 57/03 |
| | | | | | | 493/56 |
| 2012/0134770 | A1 | * | 5/2012 | Van Vught | ........... | B25J 15/0014 |
| | | | | | | 414/799 |
| 2013/0033049 | A1 | * | 2/2013 | Lang | .................. | A22C 17/0093 |
| | | | | | | 294/67.2 |

(Continued)

*Primary Examiner* — Joseph A Dillon, Jr.
(74) *Attorney, Agent, or Firm* — Sean D. Burdick; Burdick Patents, P.A.

(57) ABSTRACT

A system automatically loads a bin with a filled deformable container such as a sack of produce being conveyed along horizontal rollers. A movable support structure has a coupling end attachable to a robotic arm, and a lifting end supporting a plurality of parallel rods. By means of the robotic arm and a programmable logic controller, the plurality of parallel rods can be positioned between and parallel to the horizontal rollers, raised when the container is conveyed to a loading position above the parallel rods, moved to a predetermined position above the bin, and rotated to allow the container to slide downward along the parallel rods and into the bin under force of gravity. The loading sequence can be repeated a number of times, changing the predetermined position each time to stack a plurality of the containers in a desired configuration such as overlapping rows of offset sacks.

11 Claims, 17 Drawing Sheets

(56) References Cited

U.S. PATENT DOCUMENTS

| | | | | |
|---|---|---|---|---|
| 2015/0274447 A1* | 10/2015 | McCollum | ............ | B25J 9/0093 |
| | | | | 414/792.6 |
| 2015/0314455 A1* | 11/2015 | Morency | ............. | B25J 15/0014 |
| | | | | 414/799 |
| 2017/0144314 A1* | 5/2017 | Min | .................... | B25J 15/0014 |
| 2017/0305692 A1* | 10/2017 | Morency | ............. | B25J 15/0014 |

* cited by examiner

SECTION B-B

AUTOMATED BIN PACKING TOOL

BACKGROUND OF THE INVENTION

Field of the Invention

The present invention relates generally to automated systems for packing items into containers, more specifically to an automated bin packing tool, and most specifically to an automated tool for lifting bagged produce from a conveyor and stacking the bagged produce into a transport bin.

Description of Related Art

Recent advancements in automated systems for processing food such as harvested vegetables, particularly root and tuber crops, allow for localized cleaning and packaging of the produce at the harvesting site, rather than having harvested produce shipped by truck or train to a remote processing facility. Produce packaged locally can be shipped directly to grocery stores to simplify the supply chain and thereby lower the average sales price of the produce. To promote farm-to-market supply on a large scale, specialized bulk bins have been developed for containing and transporting packaged produce in consumer-ready form, such as a 10-lb sack of potatoes.

Bins for transporting produce from farm to market come in many shapes and sizes, and are made from many different materials. One such bin that is particularly well-suited for farm-to-market transport of produce is the "bulk bin" made from heavy-duty cardboard. FIG. 1 shows a typical bulk bin that is made from multi-walled corrugated cardboard. The bulk bin is formed in an octagonal configuration, having approximate dimensions of 46 in.×38 in.×36 in. These bulk bins have a load capacity of about 1300 lbs, and are designed for attachment to a wooden shipping pallet. If properly loaded, each bulk bin can safely contain up to 100 of the 10-lb sacks of potatoes. A cardboard cover can be placed over the bin, and so loaded, the palletized bin can be carried by forklift to a truck and delivered straight to market.

Loading the bulk bin is a manual process that is time-consuming and fraught with ergonomic risk. Workers are required to repeatedly lift produce sacks weighing 10 lbs. or more off a conveyor, like the one shown in FIG. 2, and carry them to the bulk bin. To properly load the bin, a worker must reach into the bin and place each sack individually to form a stack of overlapping rows of offset sacks, much like a pattern of mortared bricks, as shown in the cross-sectional view of FIG. 3. Over time, the worker who repeatedly stacks bulk bins in this fashion runs the risk of developing hand, arm, and back injuries.

Previous attempts to automate the process of loading containers for shipment are not suitable for loading bagged produce into bulk bins. One such automated system is designed to stack packages in a predetermined spatial arrangement for formation of a stack composed of different-sized packages. The packages run down a conveyor to a stacking site where horizontal pushers position each package first in a Z direction and then in an X direction onto a flat support, which can be raised and lowered in a Y direction to receive each package at its predetermined location. When the stack is completed, the packages must be stabilized to the support by film-wrapping, nets, or straps. While this system is effective for stacking rectangular packages of known dimensions, it cannot be used for loading a bulk bin with produce sacks whose shapes tend to deform according to how they are handled and stacked. The walls of the bulk bin would interfere with the horizontal pushers, or the bags would need to be pushed over the wall of the bin and fall to the bottom. This action would damage the produce and result in uneven and inaccurate stacking.

Another known system for automated package handling utilizes robotic arms equipped with vacuum carrying units and grippers that are designed to handle and stack different-sized packages. The system is designed to handle only smooth-sided packages that can withstand the mechanical force of its grippers and against which vacuum pressure may be drawn. The system is not suitable for loading a package with deformable sacks of produce prior to handling the package. Other known systems for loading pallets use automated conveyors and handling units to stack pallets with different-sized cartons to ensure even distribution of weight. These systems operate on prefilled cartons of generally rectangular dimensions that are loaded onto the conveyors in a predetermined sequence. The systems are not designed to load and stack deformable-shaped sacks into the cartons themselves.

What is needed is an automated scheme for efficiently loading a bulk bin with deformable containers that ensures an even distribution of weight within the bin without damaging the contents of the containers.

SUMMARY OF THE INVENTION

The present invention achieves the objective for automatically loading a bin with filled deformable containers being conveyed along horizontal rollers. The invention assembles a stack of multiple overlapping rows of such containers into the bin in a spatially efficient manner that ensures even distribution of weight throughout the bin so that the bin is ready for shipment.

In one embodiment, a method for loading into a bin an object such as a filled deformable container conveyed along horizontal rollers includes steps for positioning a plurality of parallel rods between and parallel to the horizontal rollers, raising the parallel rods when the object is conveyed to a loading position above the parallel rods, moving the parallel rods horizontally to a predetermined position above the bin, and rotating the parallel rods about a horizontal axis through a predetermined angle to allow the object to slide downward along the parallel rods and into the bin under force of gravity.

In another embodiment, a system for automatically loading into a bin an object such as a filled deformable container conveyed along horizontal rollers includes a movable support structure having a coupling end configured for attachment to a motive force, and having a lifting end supporting a plurality of parallel rods. The system includes a means for positioning the plurality of parallel rods between and parallel to the horizontal rollers, a means for raising the parallel rods when the object is conveyed to a loading position above the parallel rods, a means for moving the parallel rods horizontally to a predetermined position above the bin, and a means for rotating the parallel rods about a horizontal axis through a predetermined angle to allow the object to slide downward along the parallel rods and into the bin under force of gravity.

Whether implemented as a system or method, the invention automatically transfers an object such as a filled deformable container being carried along a conveyor into a bulk bin to form within the bin a stack consisting of multiple overlapping rows of offset containers. As each upper, overlapping row is placed onto a lower row, a vertical column of overlapping rows of offset containers is formed, with each overlapping row being at a different elevation in the column. The completed stack consists of side-by-side columns of overlapping rows of offset containers. This provides an efficiently packed and self-stabilizing formation because under force of gravity each upper container merges into the offset spacing created between adjacent lower containers.

An automated bin packing tool according to the present invention is adapted to transfer filled deformable containers from a conveyor having a general construction that includes a plurality of spaced-apart parallel horizontal rollers distributed along a conveying surface. The tool may be composed primarily of rigid parts, such as steel, aluminum, or hard plastic that are molded, machined, or extruded, and these parts are interconnected by conventional fasteners. The tool includes a movable support structure that has a coupling end and a lifting end. The coupling end may be located at the top of the support structure, and may be configured for attachment to a prime mover or other motive force such as a robotic arm configured to raise, lower, translate, and rotate the entire tool. The coupling end of the tool may include an upper plate having multiple bolt holes for facilitating attachment to the external motive force. The moveable support structure may also include an interconnected framework for supporting all components of the tool, including one or more static guide plates, one or more hinged guide plates, and one or more actuators.

The lifting end may be located at the lower end of the tool. The lifting end supports a plurality of parallel rods. Each of the parallel rods may be coupled perpendicularly, as a cantilever, to an axle. The parallel rods are configured to bear the load of an object such as a filled deformable container that contains produce. Each parallel rod has a length approximately equal to or greater than the deformable width of the filled deformable container. The diameter of each parallel rod, and the spacing between each parallel rod, is configured to allow the parallel rods to be positioned between and parallel to the horizontal rollers of a conveyor from which the tool is designed to lift the filled deformable container.

The axle is coupled at one end to a pivot point of a cam. At an opposite end of the axle, one or more bearings allow the axle to rotate in the axis of the pivot point in response to linear actuation of the cam by a pneumatic cylinder that is mounted to the framework of the moveable support structure and coupled to the cam. So configured, actuation of the pneumatic cylinder causes rotation of the parallel rods about the pivot point axis.

In one embodiment, the tool may be constructed to limit rotation of the parallel rods between a loading position at one rotational extreme and an unloading position at an opposite rotational extreme. In the loading position, the parallel rods are rotated until they are oriented substantially horizontally. In the unloading position, the parallel rods are rotated downward to a predetermined angle of about 60 degrees. The loading position and the unloading position may correspond, respectively, to the pneumatic cylinder being fully extended and to the pneumatic cylinder being fully retracted.

The static guide plate extends downward from the a central portion of the framework and provides structural support for other components of the tool, such as the actuators and the bearings that support the axle. The static guide plate includes a corrugated lower edge that consists of a wave-like pattern of regularly spaced corrugations, each forming a curved circular cutout in the lower edge. The plate is configured so that the spacing and diameter of the corrugations correspond to the spacing and diameter of the horizontal rollers on the conveyor from which the tool retrieves the filled deformable containers. The tool is configured so that when the axle is installed between the bearings and cam, the parallel rods when rotated to the loading position will extend beneath the lower edge at a location offset from the corrugations. In operation, the tool is lowered by the robotic arm so that the corrugations of the static guide plate coincide with the horizontal rollers. With the horizontal rollers so aligned within the corrugations, the parallel rods align properly within the interstices of the rollers.

The hinged guide plate may include a static portion and a moveable portion. The static portion may be fastened to the framework, and coupled by a hinge to the static portion. An actuator is configured to cause rotation of the moveable portion about the hinge. A moveable shaft emerging from one end of the actuator is connected to a hinge bracket, while the opposite, static end of the actuator is fixed to the framework. So configured, actuation of the pneumatic cylinder imparts linear motion to the shaft, causing the moveable portion of the hinged guide plate to rotate about the axis of the hinge.

In one embodiment, the tool is constructed to limit rotation of the moveable portion of the hinged guide plate between an open position and a closed position. In the closed position, the moveable portion lies in a vertical plane, directly beneath the static portion. In the open position, the moveable portion is rotated to outward to a predetermined angle of about 30 degrees to widen distance between the moveable portion and the static guide plate. In another embodiment, the lower edge of the moveable portion of the hinged guide plate may include one or more corrugations similar in shape and purpose to the corrugations on the static guide plate.

In another embodiment the tool is configured for dual loading. This embodiment includes a pair of static guide plates, which are separated by a central space wherein the axles, pivot arms, and other linkage are mounted. A hinged guide plate is mounted opposite each static guide plate to form lifting two areas, one on either side of center. Each of the two lifting areas is serviced by a static guide plate, a hinged guide plate, a set of actuators, and a set of parallel rods.

In an initial state of operation the tool configured for dual loading is lowered to a predetermined position above the conveyor where the corrugations align with the horizontal rollers. The parallel rods in both lifting areas are set to the horizontal loading position so that the rods lie between and parallel to the rollers. The hinged guide plates are set to the closed position. The next state is a ready state, in which the hinged guide plates are set to the open position for receiving a filled deformable container into each loading area.

When the containers are conveyed into position within the loading areas, the hinged guide plates are set to the closed position to securely maintain the containers within the loading areas above the parallel rods. The tool may then be raised above the conveyor, thereby raising the parallel rods through the horizontal rollers and providing a carriage for the containers.

The tool with its container load is then moved horizontally by means of the robotic arm to a predetermined position above the bin. When the tool reaches the predetermined position, the parallel rods are rotated about a horizontal axis through a predetermined angle to the unloading position. This action allows the filled deformable container to slide downward along the parallel rods under force of gravity and into the bin. The predetermined position changes for each horizontal moving step so that the bin may be loaded in a predetermined sequence that builds a stack of containers within the bin in a desired configuration. In another embodiment of the invention, a predetermined packing sequence for the tool may be programmed to include a step for lowering the parallel rods to a predetermined height above the stack after the tool has been moved horizontally to the predetermined position.

After the tool has been unloaded, final movement steps are performed to return the tool to the ready state above the conveyor where it can retrieve the next container load. The final movement steps may include a combination of vertical and horizontal moves, and may further include a step for rotating one or more hinged guide plates to the open position. The tool may then be moved again through the sequence of states for loading and unloading containers, changing only the predetermined position from which a container is packed into the bin. In one embodiment, each predetermined position is offset from an immediately previous predetermined position to create spacing between adjacent containers that slide into the bin. When containers are unloaded to form higher layers in the stack, the position of the unloading points for the higher layer are offset from the unloading points for the lower layer, so that containers drop substantially centrally onto the spacing. The deformable property of each container allows a portion of each higher level container to merge or settle into the offset spacing between adjacent lower level containers. By exploiting this property, a tool according to the invention can automatically assemble a stack of multiple overlapping rows of offset sacks into bulk bins in a spatially efficient manner that ensures even distribution of weight throughout the bin.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

This disclosure presents exemplary embodiments of an invention for automatically loading a bin with objects that are being conveyed along horizontal rollers. The invention may be implemented in the form of a system or method, and is particularly useful for loading deformable containers such as consumer-ready sacks of produce, e.g., potatoes, onions, apples, etc., into bulk bins in a spatially efficient manner that ensures even distribution of weight throughout the bin. Embodiments described herein illustrate use of the invention for loading into the bin filled deformable containers such as produce sacks; however, the invention has equal utility for loading a wide variety of objects from a conveyor into a bin, including but not limited to many shapes and sizes of rigid containers, raw materials, and unpackaged manufactured products.

Figure 1:
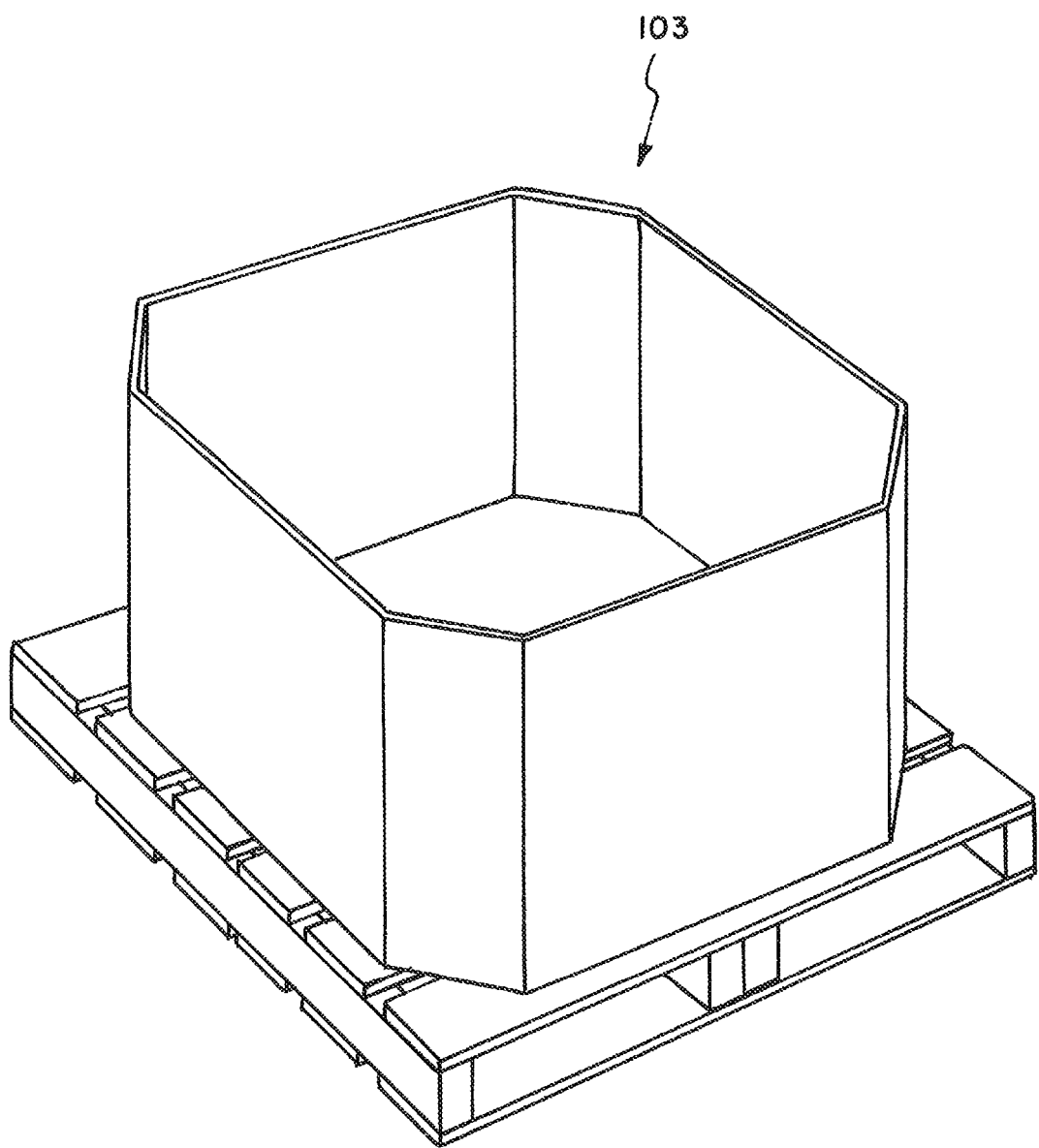
FIG. 1 is a perspective view of a bulk bin, known in the prior art, that can be used for containing and transporting produce directly from farm to market.
Figure 2:
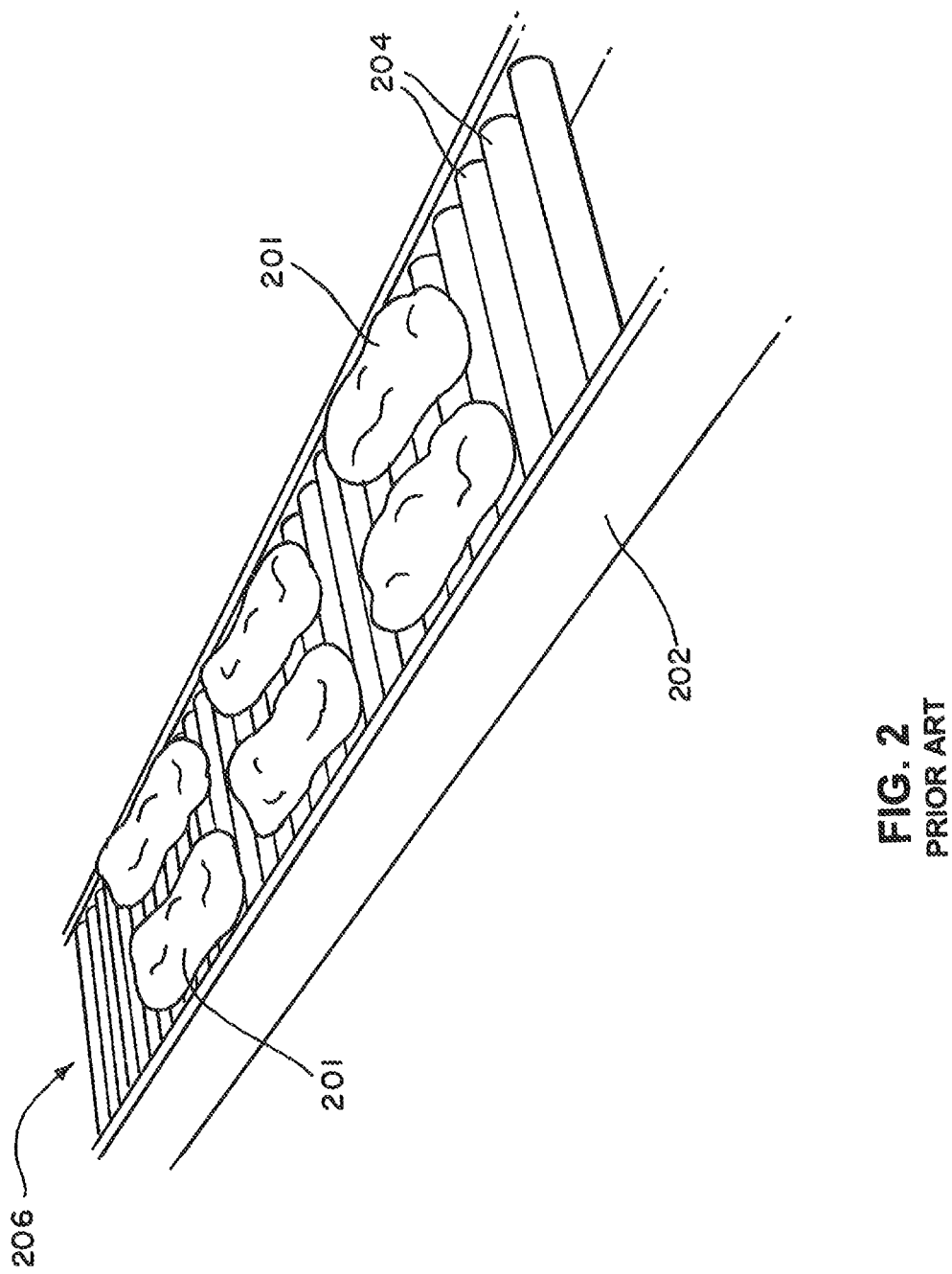
FIG. 2 is a perspective view of a conveyor with horizontal rollers, known in the prior art, shown with two rows of three potato sacks spaced along the conveyor.
Figure 3:
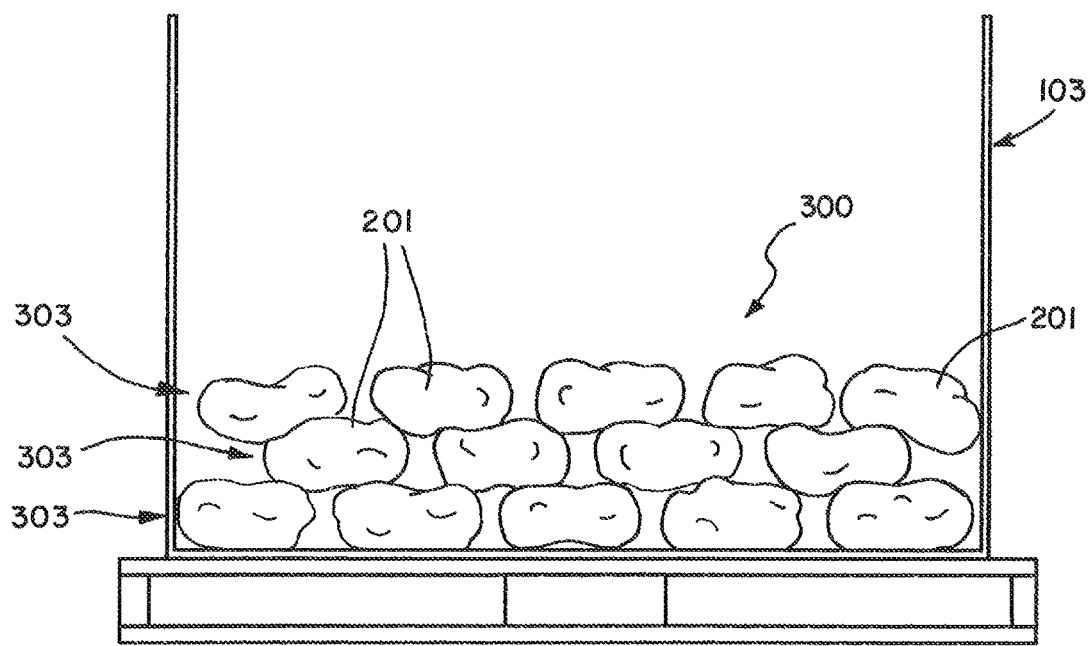
FIG. 3 is a front cross-sectional view of bulk bin containing overlapping rows of produce sacks stacked like bricks in an offset pattern known in the prior art.

With reference again to FIGS. 1-3, in one implementation of the invention a system or method disclosed herein automatically transfers filled deformable containers 201 (e.g. sacks of produce) being carried along a conveyor 202, into a bulk bin 103 to form within the bin a stack 300 consisting of multiple overlapping rows 303 of offset containers 201. This pattern of overlapping rows of offset containers resembles in cross section the familiar pattern made by bricks set within a mortared wall. As each upper overlapping row is placed onto a lower row, a vertical column of overlapping rows of offset containers is formed, with each overlapping row being at a different elevation in the column. When filling the volume of the bin with deformable containers such as produce sacks, the bin may be filled most efficiently, and the weight distributed most evenly, when the sacks are arranged in a stack consisting of side-by-side columns of overlapping rows of offset sacks.

As used herein, the term deformable container means a container that has a non-rigid outer surface capable of changing shape. In particular, the overall shape of the deformable container can change according to movement or displacement of items contained within the deformable container that push against the outer surface. Nonlimiting examples of deformable containers are plastic bags, burlap sacks, and cloth bags. As discussed herein, a sack of produce such as the 10-lb sack of potatoes is an example of a filled deformable container. Depending on its contents, a filled deformable container tends to assume the general shape of the surface on which it rests. It should be appreciated that the side-by-side columns of overlapping rows of offset sacks as described in the preceding paragraph provide an efficiently packed and self-stabilizing formation for stacking filled deformable containers because under force of gravity each upper sack merges and settles into the offset spacing created between adjacent lower sacks.

The present invention is adapted to transfer filled deformable containers 201 from a conveyor 202 having a general construction that includes a plurality of spaced-apart parallel horizontal rollers 204 distributed along a conveying surface 206. Such conveyors are well known in the art and are manufactured in a variety of configurations. For example, one size conveyor has 1⅜ in. diameter rollers spaced apart on 3.0 in. roller centers, mounted in steel frames. A heavier duty conveyor of similar construction has 1.9 in. diameter rollers spaced apart on 6.0 in. roller centers. The invention may be adapted dimensionally to interface with any and all sizes of conveyors having this general construction.

Figure 4:
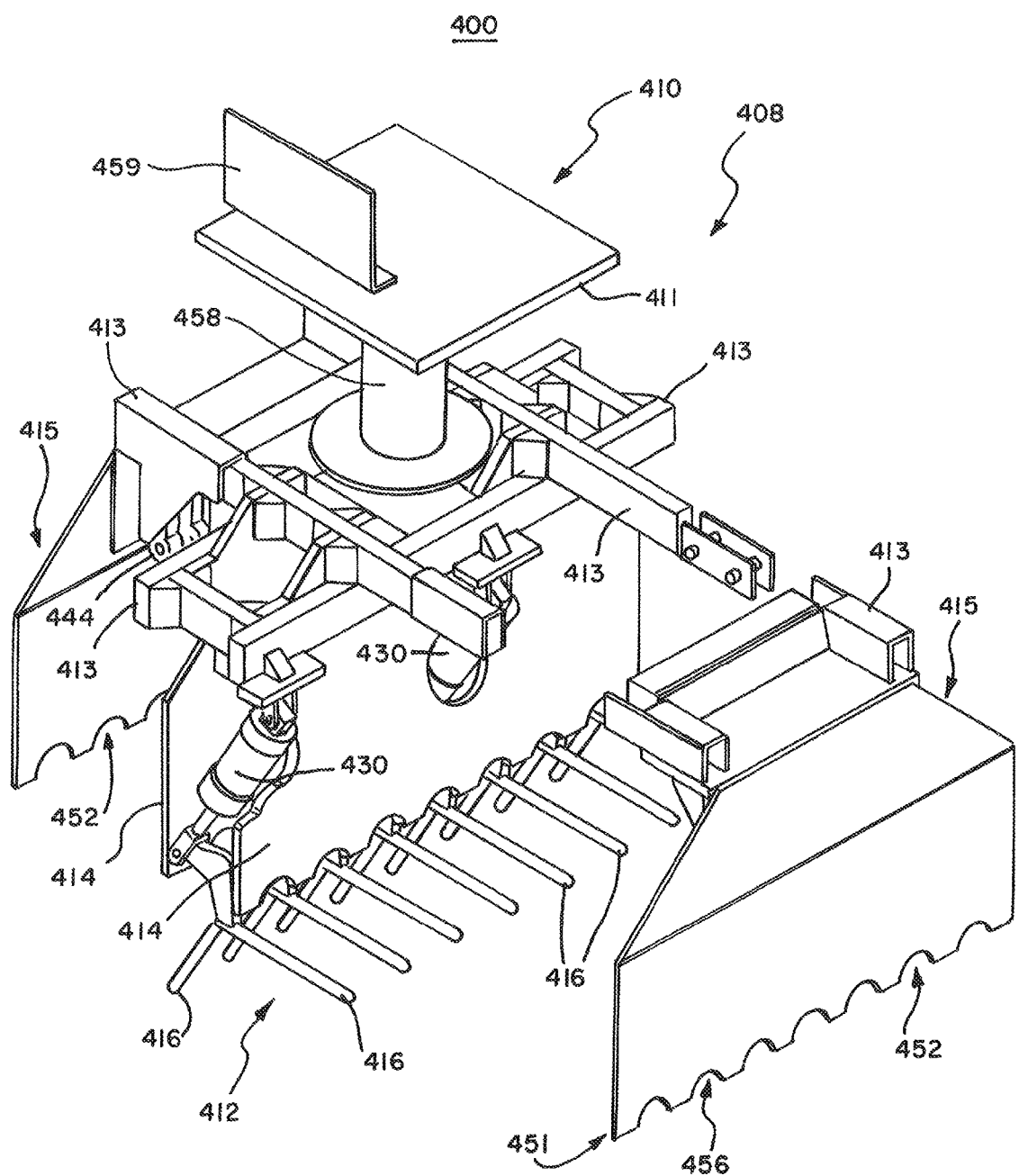
FIG. 4 is an exploded perspective view of an automated bin packing tool according to one embodiment of the present invention.
Figure 5:
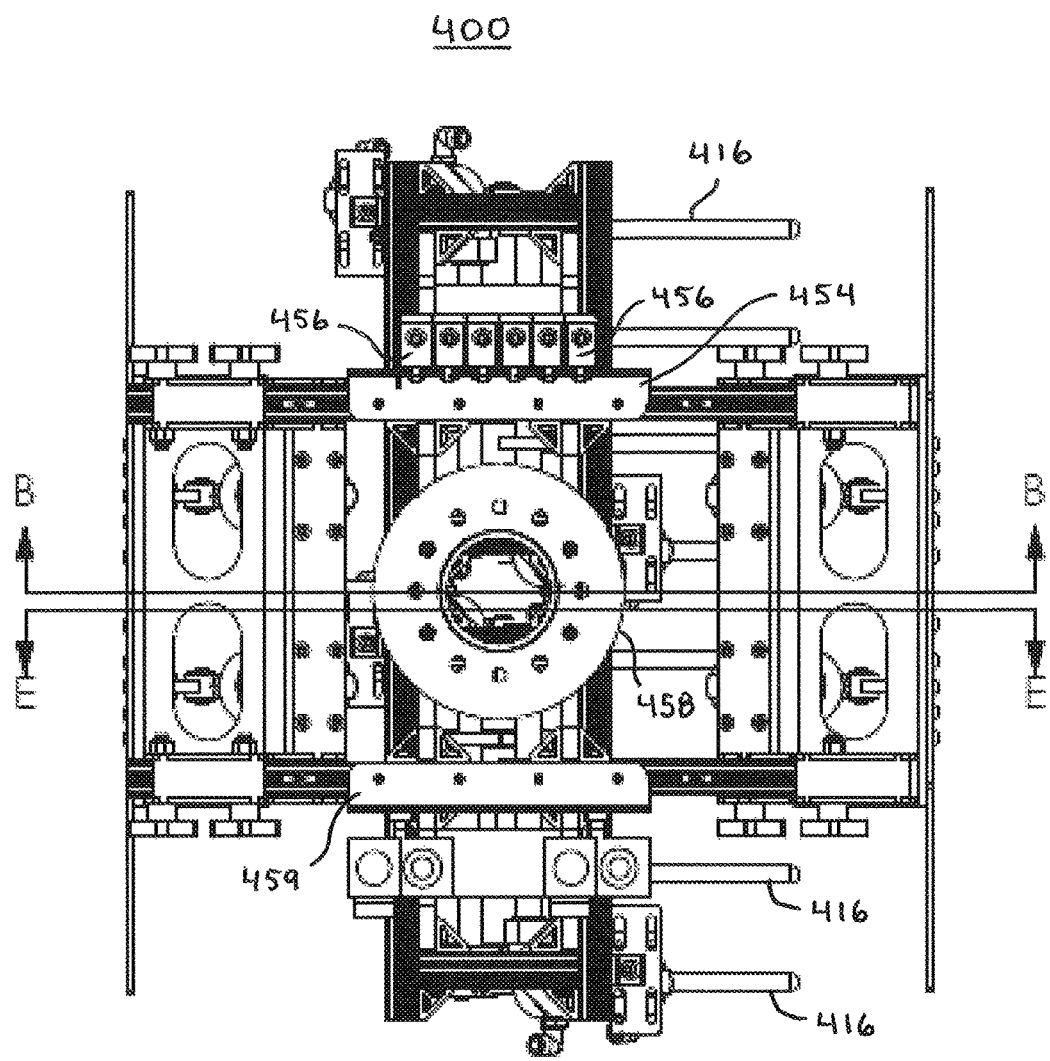
FIG. 5 is a top view of the automated bin packing tool of FIG. 4.

FIG. 4 shows an exploded perspective view of an automated bin packing tool 400 according to one embodiment of the present invention. FIGS. 5 to 10 show different views of the same embodiment, to shed further light on the following discussion. The automated bin packing tool 400 may be composed primarily of rigid parts, such as steel, aluminum, or hard plastic that is molded, machined, or extruded, and these parts are interconnected by conventional fasteners suitable for the purpose. Generally speaking, the tool 400 includes a movable support structure 408 that has a coupling end 410 and a lifting end 412. The coupling end 410 may be located at the top of the support structure 408, and may be configured for attachment to a prime mover or other motive force having energy sufficient to raise, lower, translate, and rotate the entire tool. Accordingly, the coupling end 410 of tool 400 may include an upper plate 411 having bolt holes defined therethrough or other means thereon for facilitating attachment to the external motive force. The moveable support structure 408 may also include an interconnected framework 413 for supporting all components of the tool, including one or more static guide plates 414, one or more hinged guide plates 415, and one or more actuators 430.

In one embodiment, the motive force attachable to the coupling end 410 comprises a robotic arm (not shown). Robotic arms are well known in the manufacturing arts and may be programmed by means of a programmable logic controller to effect precision positioning of tools for performing repetitive tasks. As such, no further description of robotic arms or programmable logic controllers is provided herein. It should be appreciated however, that such a robotic arm coupled to a system according to the invention may form part of the means for positioning, raising, moving, or rotating parallel rods 416, as further described below.

The lifting end 412 may be located at the lower end of the tool 400. The lifting end 412 supports a plurality of parallel rods 416. Each of the parallel rods 416 may be coupled perpendicularly, as a cantilever, to an axle 418. The parallel rods 416 should be configured for sufficient strength to withstand the load of a filled deformable container 201 that the tool 400 is designed to lift. Each parallel rod 416 should have a length sufficient to support a container 201, for example, a length approximately equal to or greater than the deformable width of a container 201 that is being carried along the conveyor 202. In addition, the diameter of each parallel rod 416, and the spacing between each parallel rod 416, should be configured to allow the parallel rods to be positioned between and parallel to the horizontal rollers 204 of a conveyor 202 from which the tool 400 is designed to lift a filled deformable container 201. That is, each parallel rod 416 should have a diameter less than the spacing between any two adjacent horizontal rollers 204 to allow the parallel rods to be lowered together through the interstices of the rollers 204, extending substantially parallel to the rollers 204, to a position below the conveying surface so that the rods 416 do not interfere with containers 201 being conveyed along the rollers 204. The spacing between each parallel rod 416 may be the same as the spacing between horizontal rollers (e.g. one rod per roller), or the spacing between each parallel rod 416 may be greater than the spacing between horizontal rollers (e.g. one rod for every three rollers). In other embodiments, the parallel rods 416 may be evenly spaced (i.e. equal spacing between any two adjacent rods) or unevenly spaced (i.e. spacing between two adjacent rods unequal to the spacing between at least one other pair of adjacent rods).

The axle 418 is coupled at one end to a pivot point 420 of a cam 422. At an opposite end of the axle 418, one or more bearings 424 allow the axle to rotate in the axis of the pivot point in response to linear actuation of the lobe 426 of cam 422. The lobe 426 of the cam 422 may be actuated, for example, by a shaft 428 of an actuator 430 (e.g., a pneumatic cylinder 430) that is mounted to the framework 413 of the moveable support structure 408 and coupled to the lobe 426, as shown. So configured, actuation of the pneumatic cylinder 430 causes rotation of the parallel rods 416 about the pivot point axis. One example of a pneumatic cylinder suitable for this purpose is a model 312-DXP made by the Bimba Manufacturing Co.

In one embodiment, the tool 400 may be constructed to limit rotation of the parallel rods 416 between a loading position 432 at one rotational extreme and an unloading position 434 at an opposite rotational extreme. In the loading position 432, the parallel rods 416 are rotated until they are oriented substantially horizontally. In the unloading position 434, the parallel rods are rotated downward to a predetermined angle of about 60 degrees with respect to the horizontal. The loading position 432 and the unloading position 434 may correspond, respectively, to the pneumatic cylinder 430 being fully extended and to the pneumatic cylinder 430 being fully retracted. Other embodiments are possible in which these relationships are reversed.

Figure 10:
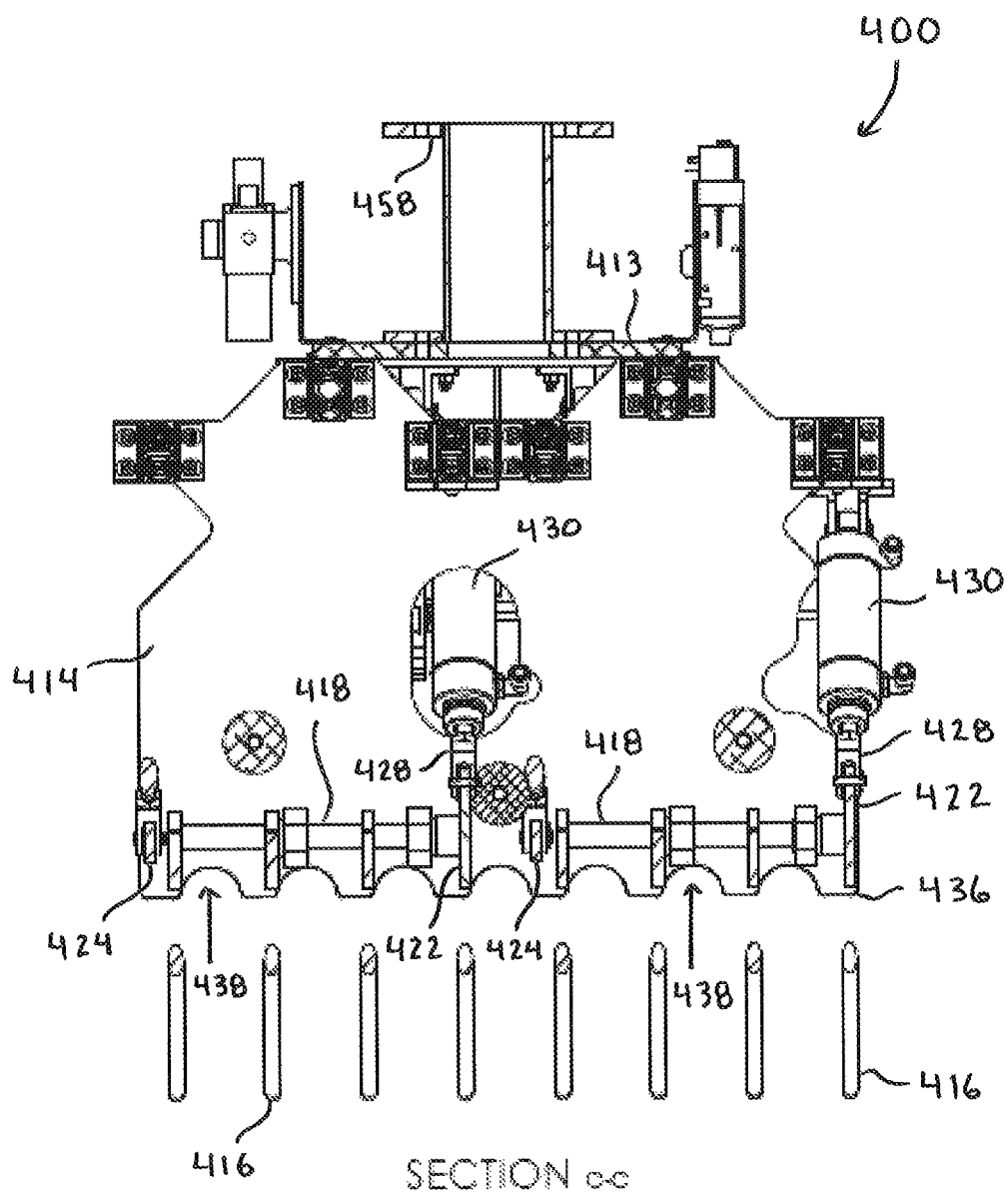
FIG. 10 is a cross-sectional side view of the automated bin packing tool taken along section D-D of FIG. 8.

The static guide plate 414 extends downward from the framework 413 and occupies a substantially central position with respect to other parts of the tool 400. The static guide plate 414 may provide structural support for other components of the tool, such as the actuators 430, and the bearings 424 that support the axle 418. In addition, the static guide plate 414 may include a corrugated lower edge 436. The corrugated lower edge 436 consists of a wave-like pattern of regularly spaced corrugations 438, each corrugation forming a curved circular cutout in the lower edge. The plate 414 is configured so that the spacing and diameter of the corrugations 438 correspond to the spacing and diameter of the horizontal rollers 204 on the conveyor 202 from which the tool 400 retrieves containers 201. As best depicted in FIG. 10, the tool 400 is configured so that when the axle 418 is installed between the bearings 424 and cam 422, the parallel rods 416 when rotated to the loading position 432 will extend beneath the lower edge 436 at a location offset from the corrugations 438. In operation, the tool 400 is lowered by the robotic arm so that the corrugations 438 of the static guide plate 414 coincide with the horizontal rollers 204, that is, each corrugation 438 partially surrounds the top surface of a roller 204. With the horizontal rollers 204 so aligned within the corrugations 438, the parallel rods 416 will align properly within the interstices of the rollers 204.

Figure 6:
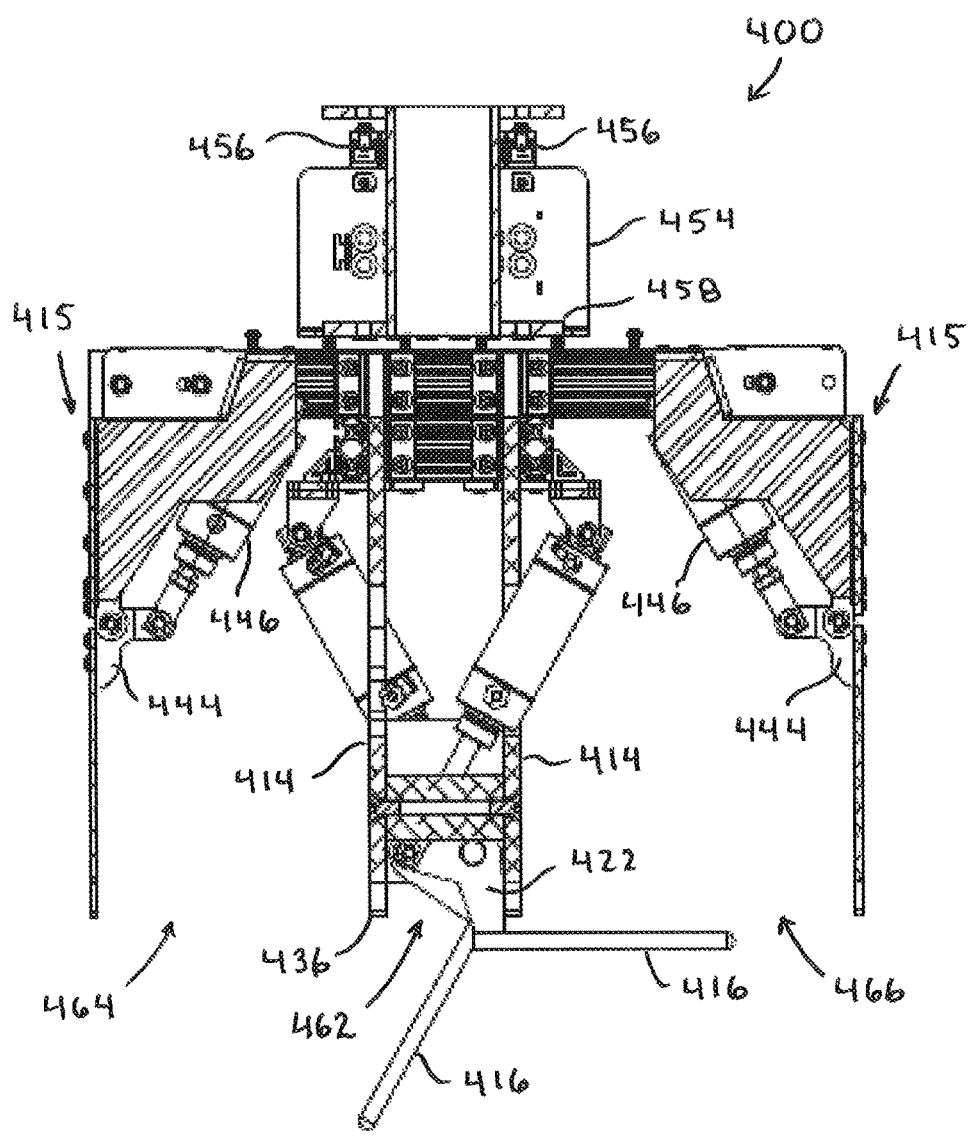
FIG. 6 is a cross-sectional frontal view of the automated bin packing tool taken along section B-B of FIG. 5.
Figure 7:
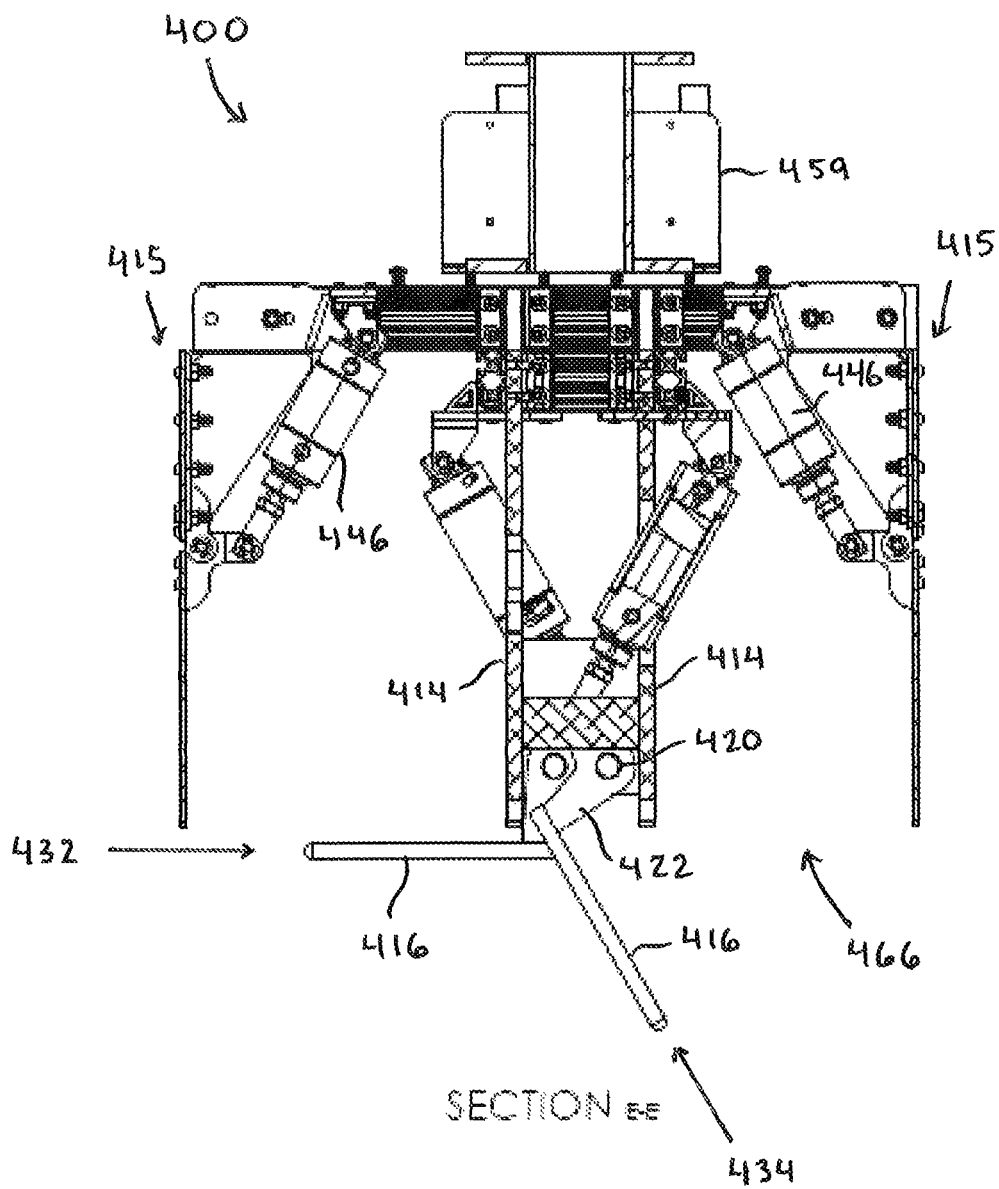
FIG. 7 is a cross-sectional rear view of the automated bin packing tool taken along section E-E of FIG. 5.
Figure 8:
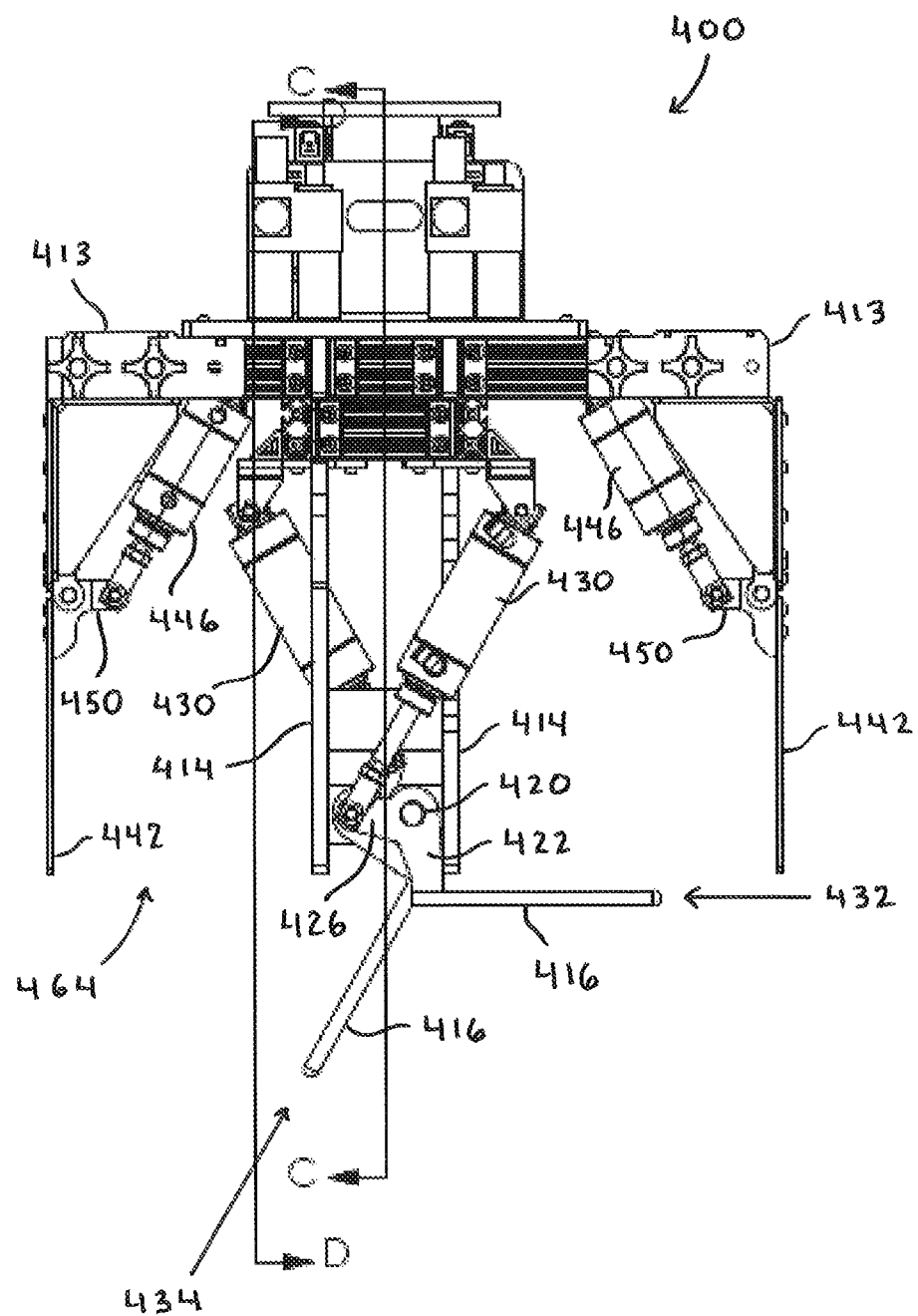
FIG. 8 is a frontal view of the automated bin stacking tool of FIG. 4.
Figure 9:
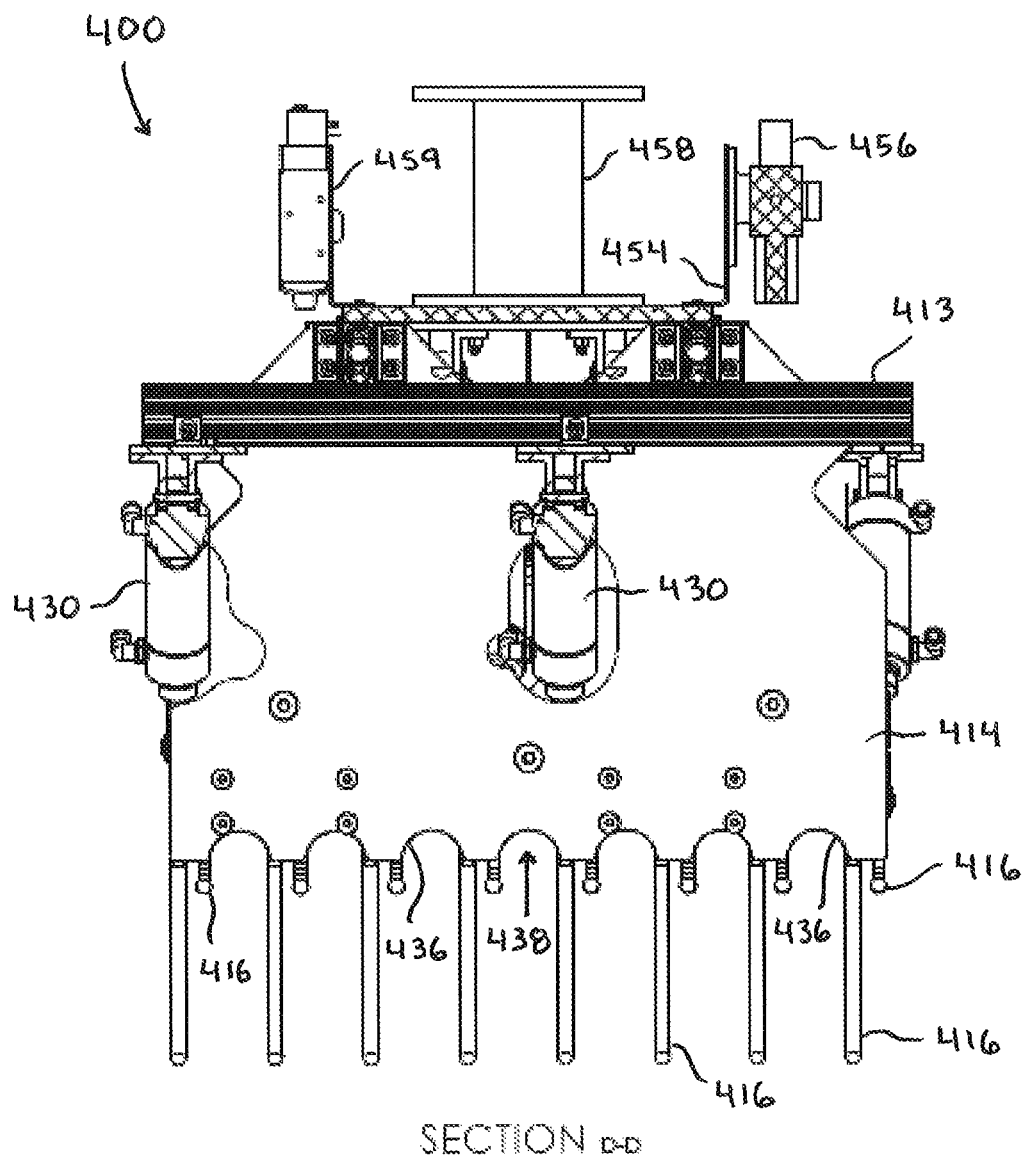
FIG. 9 is a cross-sectional side view of the automated bin packing tool taken along section C-C of FIG. 8.

The hinged guide plate 415 may include a static portion 440 and a moveable portion 442. The static portion 440 may be fastened to the framework 413, and coupled by a hinge 444 to the static portion 440, as shown in FIGS. 4 and 6. An actuator 446 may be configured to cause rotation of the moveable portion 442 about the hinge 444. For example, actuator 446 may be a pneumatic cylinder similar in construction to actuator 430. A moveable shaft 448 emerging from one end of the actuator 446 may be connected to a hinge bracket 450, while the opposite, static end of the actuator 446 may be fixed to the framework 413, as shown. So configured, actuation of the pneumatic cylinder imparts linear motion to the shaft 448, causing the moveable portion 442 of the hinged guide plate 415 to rotate about the axis of hinge 444.

Figure 11:
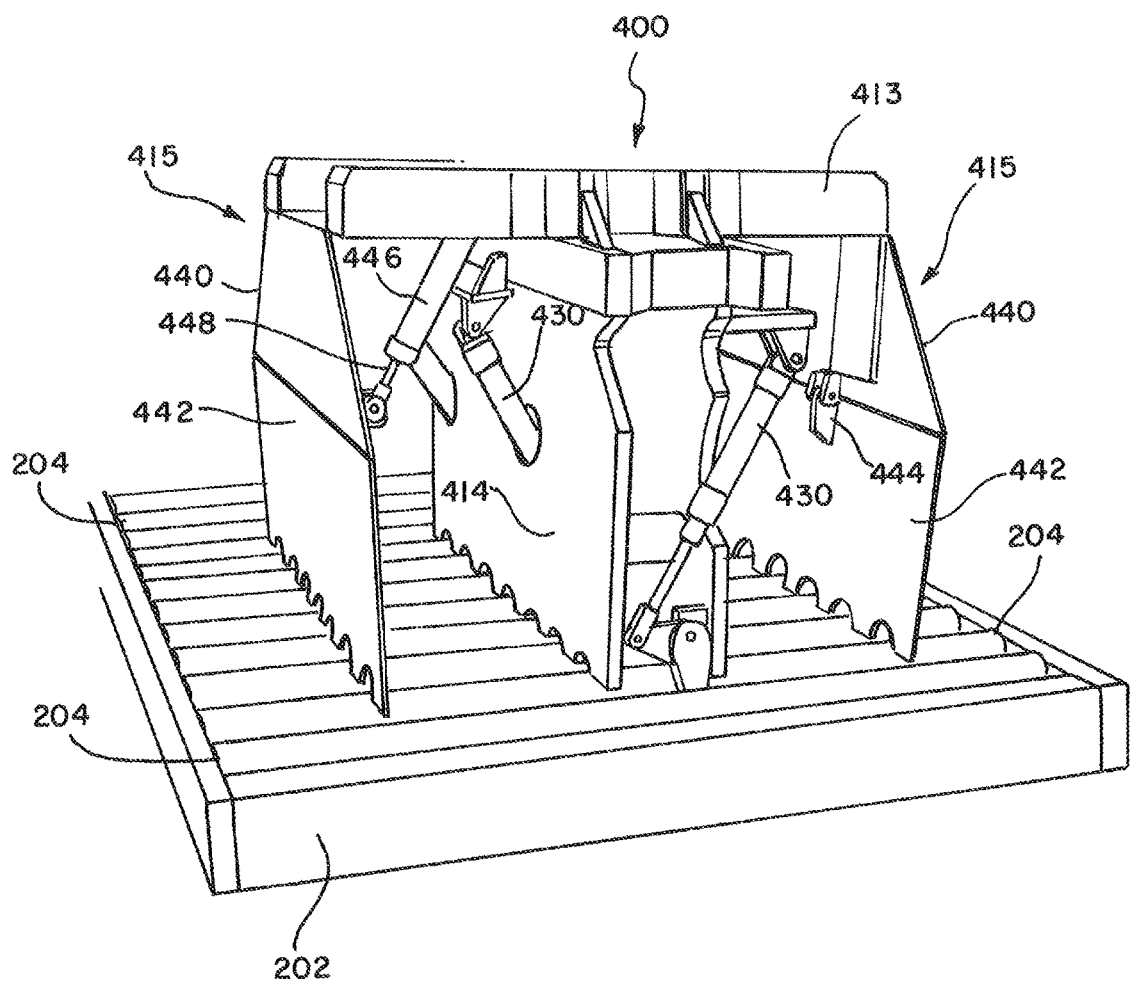
FIG. 11 is a perspective view of one embodiment according to the invention of a bin packing tool in an initial state positioned above a conveyor having horizontal rollers.

In one embodiment, the tool 400 may be constructed to limit rotation of the moveable portion 442 between an open position and a closed position. In the closed position, the moveable portion 442 lies in a vertical plane, directly beneath the static portion 440, as illustrated in FIG. 11. In the open position, illustrated in FIG. 12, the moveable portion 442 is rotated to outward to a predetermined angle to widen distance between the moveable portion 442 and the static guide plate 414. In one embodiment, the predetermined angle is about 30 degrees with respect to the vertical. Other embodiments having a different predetermined angle are possible, and the angle may vary according to the distance between the moveable portion 442 and the static guide plate 414 that is required to permit passage of a particular container 201 therethrough. In another embodiment, the predetermined angle is selectable and can range between zero degrees in the closed position and about 45 degrees in the fully open position.

In one embodiment of the invention, as shown in FIG. 4, the lower edge 451 of the moveable portion 442 of the hinged guide plate 415 may include one or more corrugations 452. The corrugations 452 may be similar in shape and purpose to the corrugations 438 on static guide plate 414, and may assist in properly aligning the tool 400 to the conveyor 202.

Various accessories may also be mounted to the tool 400 to effect or assist with control and operation of the tool. Again with reference to FIG. 4, one such accessory may be a control valve mounting assembly 454 coupled to the framework 413 at a convenient location. The mounting assembly 454 may be used, for example, in an embodiment of the tool 400 that utilizes pneumatic cylinders to function as the actuators 430 or 446. One or more solenoid valves 456 may be mounted within the mounting assembly 454, and connected via pneumatic tubing between the actuators 430, 446 and a source of compressed air (not shown). The solenoid valves 456 are connected electrically to a power supply through the programmable logic controller or another control scheme according to methods well known in the art to enable fully automatic control, or a combination of manual and automatic control, of the actuators 430, 446. Another accessory, flanged conduit 458, may be connected between the upper plate 411 and the framework 413, through which electrical or pneumatic lines, or both, may be run for powering the actuators 430, 446. The flanged conduit 458, by mechanical connection, may also form part of the means for positioning, raising, moving, and rotating the parallel rods 416. Brackets such as 459 may be attached to the upper plate 411 or framework 413, for mounting accessories or for routing pneumatic or electrical lines.

The embodiment of the present invention shown throughout FIGS. 4 to 15 is configured for dual loading. This embodiment includes a pair of static guide plates 414, which are separated by a central space 462 wherein the axles 418, pivot arms 422, and other linkage are mounted. A hinged guide plate 415 is mounted opposite each static guide plate 414, to form lifting two areas 464 and 466 to either side of center, as shown. Thus, each of the two lifting areas is serviced by a static guide plate 414, a hinged guide plate 415, a set of actuators 430, an actuator 446, and a set of parallel rods 416, all of which operate as heretofore described.

Operation of the tool 400 according to the present invention is now described with further reference to FIGS. 11 to 17. Each of the movements described below may be effected by manual controls, or preferably automatically by the programmable logic controller executing an algorithm for precise positioning of the tool 400. The precise locations of the conveyor 202 and bin 103 may be registered in the programmable logic controller during an initialization procedure to ensure accurate collection of containers 201 from the conveyor 202 and placement of the containers 201 within the bin 103. Once the system is initialized, the programmable logic controller outputs its control signals to the robotic arm, which moves the tool 400 through a sequence of predetermined positions or states. The programmable logic controller may output additional control signals to the actuators 430, 446 to cause movement of the parallel rods 416 or hinged guide plates 415 depending on the state of the tool.

Figure 12:
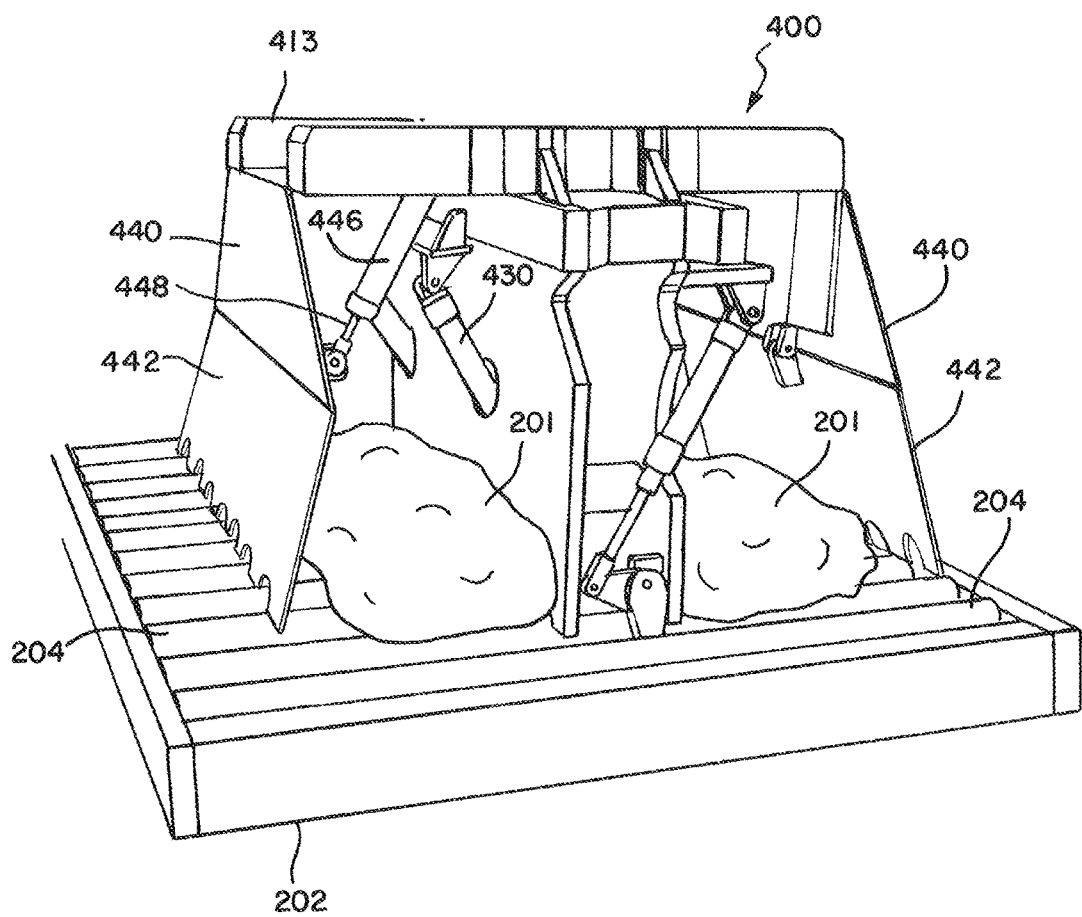
FIG. 12 is a perspective view of the automated bin packing tool of FIG. 11 in a ready state of use as two sacks of produce are conveyed within reach of the tool, with hinged guide plates moved to an open position.

FIG. 11 shows the tool 400 in an initial state above the conveyor 202. Here, the tool 400 has been lowered to a predetermined position where the corrugations 438 and 452 align with the horizontal rollers 204. In this state, the parallel rods 416 in both lifting areas 464, 466 are set to the horizontal loading position 432 so that the rods 416 lie between and parallel to the rollers 204. Also in the initial state, the hinged guide plates 415 are set to the closed position. The next state is a ready state, in which the hinged guide plates 415 are set to the open position, as shown in FIG. 12. In this state the tool 400 is ready to receive a filled deformable container 201 into each of its loading areas. In one embodiment, conveyance of a container into a loading area may be sensed by automatic means, such as by a position sensor, and a corresponding sensory signal sent as feedback to the programmable logic controller signaling that the tool is ready for movement to the next state.

Figure 13:
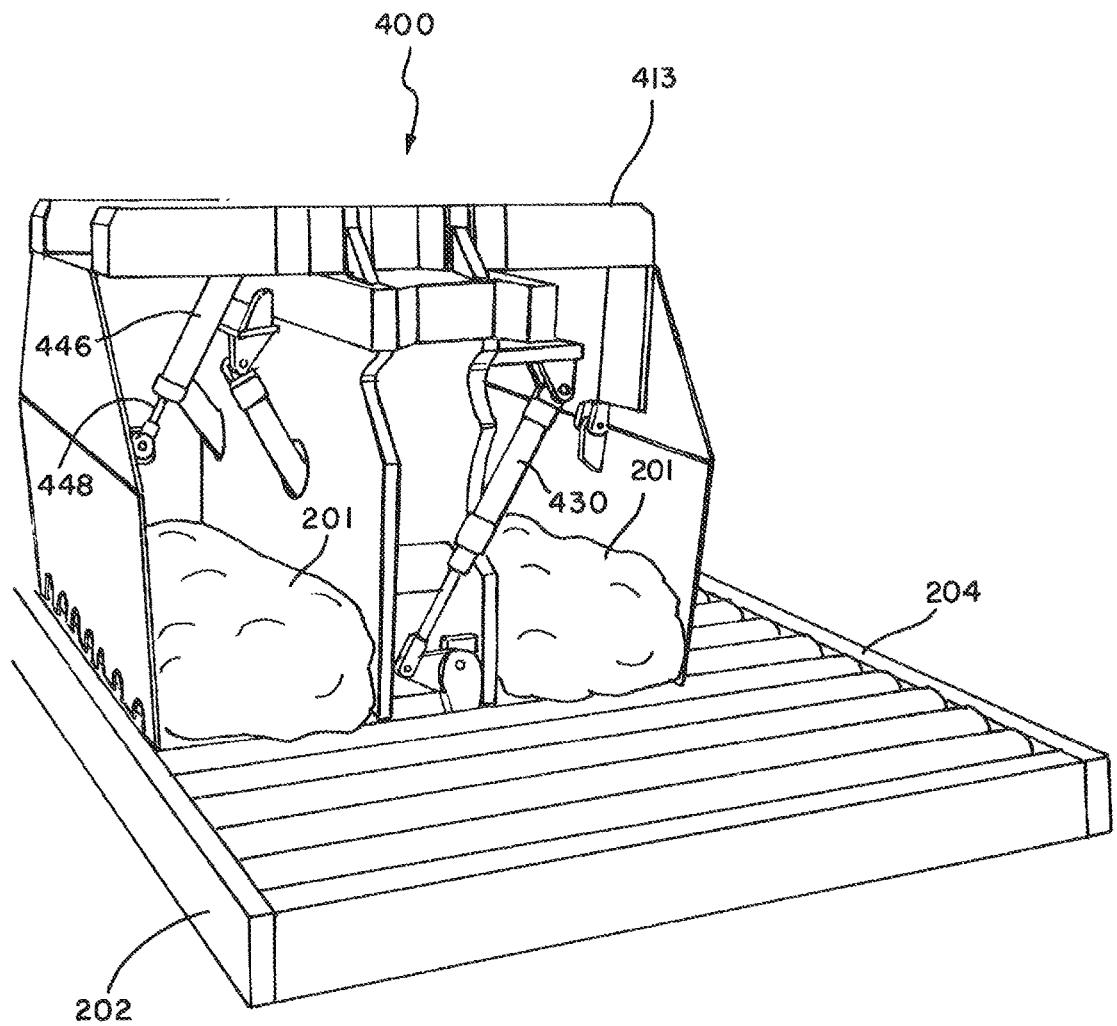
FIG. 13 is a perspective view of the bin packing tool of FIG. 12 in a later state of use, showing the tool lifting the two produce sacks above the conveyor, with hinged guide plates in a closed position.

When the containers 201 are conveyed into position within the loading areas 464, 466, the hinged guide plates 415 are again set to the closed position, to securely maintain the containers 201 within the loading areas above the parallel rods 416. As shown in FIG. 13, the tool 400 may then be raised above the conveyor 202. This action raises the parallel rods 416 through the horizontal rollers 204, providing a carriage for containers 201. The parallel rods 416 are preferably raised to a predetermined height above the conveyor 202 that is also higher than the bin 103 into which containers 201 are to be stacked by the tool 400.

Figure 14:
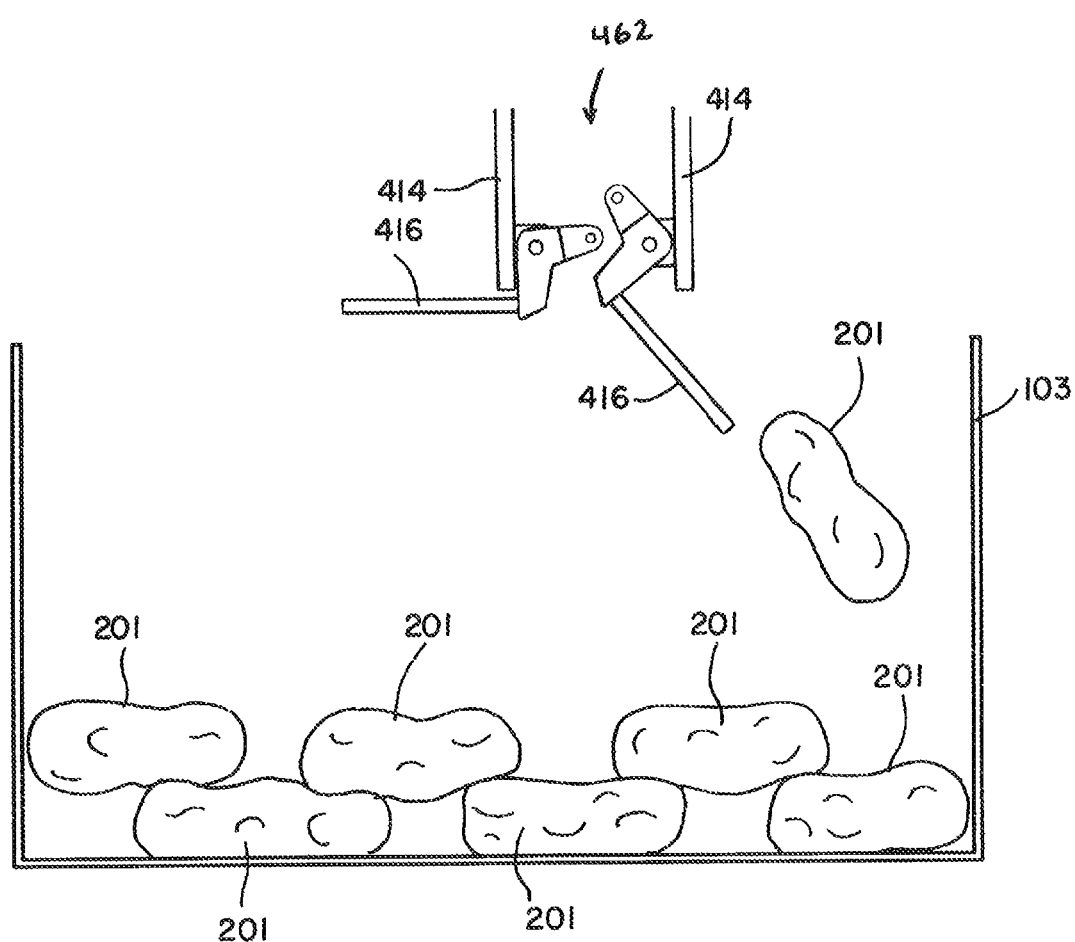
FIG. 14 is a cross-sectional side view of a bulk bin being loaded by an automated bin packing tool according to the invention.
Figure 15:
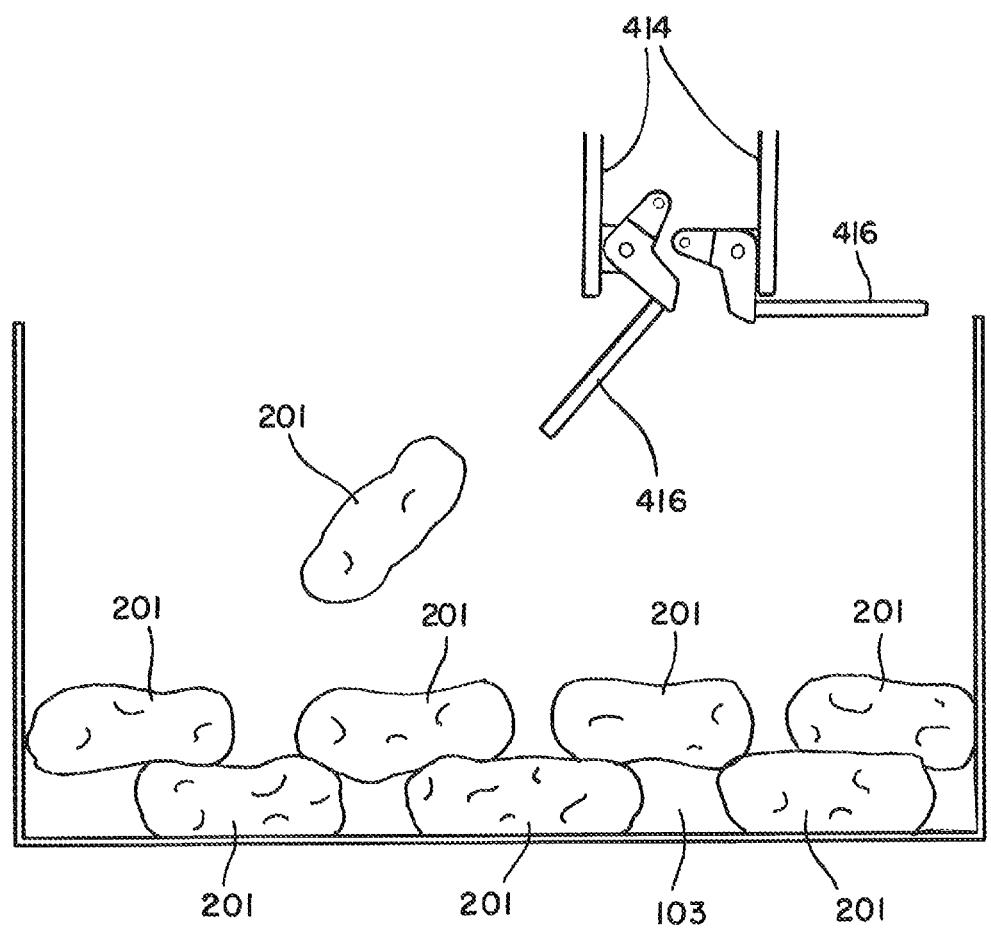
FIG. 15 is another cross-sectional side view of a bulk bin being loaded by an automated bin packing tool according to the invention.

The tool 400 with its container load supported by parallel rods 416 and secured between guide plates 414, 415 is then moved horizontally by means of the robotic arm or other motive force to a predetermined position above the bin 103. FIG. 14 shows a cross-sectional side view depicting a bulk bin 103 being packed by the tool 400 by unloading lifting area 466 at the predetermined position. When the tool reaches the predetermined position, the parallel rods 416 are rotated about a horizontal axis through a predetermined angle, as described above, to the unloading position 434. This action allows the filled deformable container 201 to slide downward along the parallel rods 416 under force of gravity and into the bin 103. The predetermined position will typically change each time the horizontal moving step is performed, so that the bin 103 may be loaded in a predetermined sequence that builds a stack of containers 201 within the bin 103 in a desired configuration. If the tool 400 is configured with a second lifting area 464, rotation of the corresponding second set of parallel rods 416 may occur at the same predetermined position, or after further movement of the tool 400 to a subsequent predetermined position, depending on the loading scheme of the predetermined sequence. FIG. 15 shows a cross-sectional side view of the bulk bin 103 being packed by the tool 400 by unloading lifting area 464 at the same predetermined position depicted in FIG. 14.

In another embodiment of the invention, a predetermined packing sequence for the tool 400 may be programmed to include a step for lowering the parallel rods, i.e. lowering the tool 400, to a predetermined height above the stack after the tool has been moved horizontally to the predetermined position. Such a step may be desirable, for example, to improve placement accuracy of a container 201 or to limit the distance that a container 201 must drop before it reaches its position in the stack to avoid damaging the contents of the container.

After the tool 400 has been unloaded, final movement steps are performed to return the tool 400 to the ready state above the conveyor 202 where it can retrieve the next container load. The final movement steps may include a combination of vertical and horizontal moves, and may further include a step for rotating one or more hinged guide plates 415 to the open position. The tool 400 may then be moved again through the sequence of states for loading and unloading containers, changing only the predetermined position from which a container is packed into the bin. In other words, after the loaded parallel rods are moved horizontally to the first predetermined position above the bin 103 and unloaded, the tool is returned to the ready state, the sequence of steps for positioning and raising the parallel rods is repeated, and the parallel rods are moved horizontally to a subsequent predetermined position above the bin to unload a container at the next location in the stack.

Figure 16:
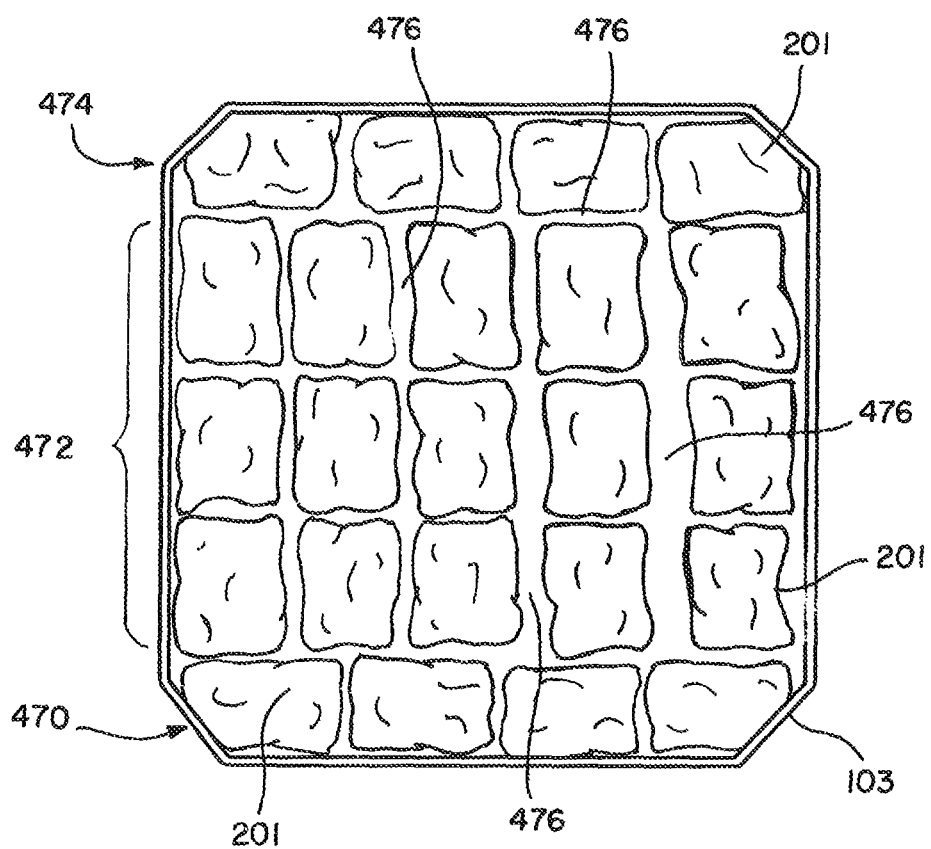
FIG. 16 is a top view of an octagonal bulk bin containing stacked rows of produce sacks in a pattern wherein sacks in the front and rear rows are oriented 90 degrees with respect to sacks in all other rows.

The predetermined sequence for packing a bin 103 may vary according to the size and configuration of the bin 103, the size, configuration, and number of containers 201, and by the desired geometry of the stack. A tool 400 according to the invention may be employed to achieve any number of different stacking configurations. By way of example, one such stacking configuration is depicted in FIG. 16. This figure shows a top view of an octagonal bulk bin 103 containing stacked rows of filled deformable containers 201 in a particular pattern. This pattern may be used, for example, for packing a bulk bin with 10-lb sacks of potatoes. In this example, there is a front row 470 where containers 201 lie end-to-end, there are middle rows 472 where more containers 201 lie side-by-side, and there is a rear row 474 where more containers 201 lie end-to-end. Thus, the containers in the front and rear rows are oriented 90 degrees with respect to the containers in the middle rows. Each container 201 has been packed into the bin 103 after being dropped by the tool 400 from a different predetermined position above the bin in a predetermined sequence, where each predetermined position is offset from an immediately previous predetermined position to create spacing 476 between adjacent containers that slide into the bin. In one embodiment designed for packing 10-lb sacks of potatoes, the spacing 476 is about 6 to 8 inches. In operation, to effect the 90-degree change in orientation between containers lying end-to-end and containers lying side-by-side, the tool 400 must undergo an additional movement step. In this additional step, after the parallel rods 416 are moved horizontally to the predetermined position above the bin 103, the rods 416 are then rotated within a horizontal plane about a vertical axis. In this example, the angle of rotation is 90 degrees, however, the angle may be varied to achieve any desired placement pattern.

Figure 17:
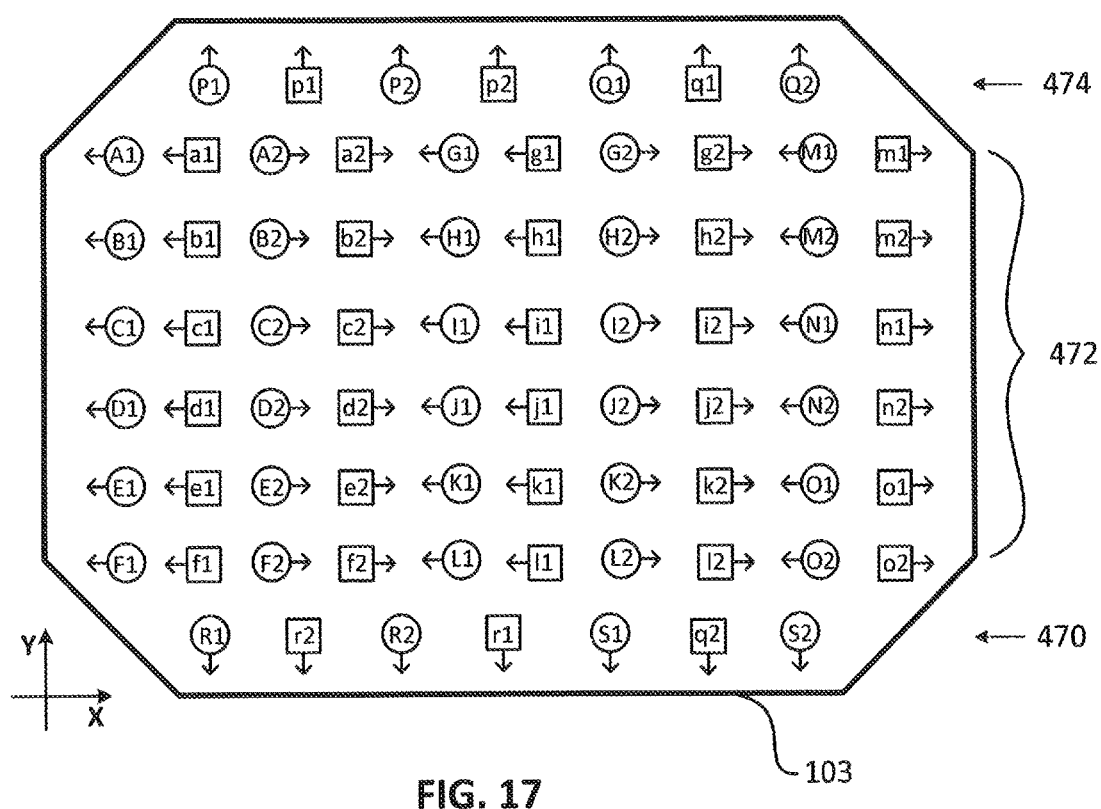
FIG. 17 is a top view of an octagonal bulk bin showing a superimposed pattern of target points at each of which an automated bin packing tool unloads packaged produce in a predetermined sequence according to one embodiment of the invention.

FIG. 17 illustrates one example of a pattern of predetermined positions at each of which a tool 400 unloads filled deformable containers 201 in a predetermined sequence according to one embodiment of the invention. The pattern of predetermined positions, which consists of rows of numbered and lettered circles and squares, is shown superimposed onto an octagonal bulk bin 103. An imaginary X-Y plane is depicted in the lower left-hand corner of the figure. The origin of the X-Y plane may be registered with the programmable logic controller as a reference point from which all predetermined positions are located, for example, as end points for directing movement of the robotic arm when moving parallel rods 416 of tool 400 horizontally to the predetermined positions.

In the exemplary sequence modeled in FIG. 17 there are circles and squares. Each circle and square indicates a predetermined position, or unloading point, at which a set of parallel rods 416 unloads a filled deformable container 201 into the bin 103. The circles indicate an unloading point on a lower layer of the stack. The squares indicate an unloading point on a higher layer of the stack that rests on top of the lower layer. Each circle and square also has an arrow pointing away from the circle or square in one direction. The arrow indicates the direction toward which a filled deformable container 201 slides off a set of parallel rods 416. A letter within a circle or square denotes the unloading order according to the sequence, which is carried out in alphabetical order, wherein all unloading occurs first at the upper case letters before continuing with lower case letters. A number within a circle or square indicates which of multiple loading areas in a single tool is to be unloaded at the unloading point. In this example, the tool 400 is configured with dual loading areas 464 and 466. The number 1 in A1 corresponds to a first loading area 464 and the number 2 in A2 corresponds to a second loading area 466.

The unloading sequence therefore begins at points A1 and A2 near the upper left-hand corner of the bin. The tool 400, configured with dual loading areas, is moved horizontally above the bin until the parallel rods 416 of the first loading area reach unloading point A1 and the parallel rods 416 of the second loading area reach unloading point A2. There, the rods 416 are rotated downward, causing the filled deformable containers 201 to slide off the rods—to the left of A1 and to the right of A2—and into the bin so that the containers 201 are oriented side-by-side and separated by the desired spacing 476. The sequence then continues. The tool 400 returns to the conveyor to fetch more containers, moves the two sets of parallel rods to unloading points B1-B2, and drops the containers at those locations. The sequence is repeated in the same manner, dropping containers at C1-C2, then D1-D2, E1-E2, F1-F2, G1-G2, H1-H2, I1-I2, J1-J2, K1-K2 and L1-L2, forming a lower layer of containers in a 4×6 array. Then a final row is unloaded on the right-hand side of the bin 103 to complete the 5×6 array at the lower level of middle rows 472. In the final row, the containers are dropped one at a time in the order M1, M2, N1, N2, O1, and O2. This order requires that, after unloading a container from a first set of parallel rods 416 at an unloading position M1, N1, or O1, the tool 400 configured for dual loading must be repositioned by horizontal movement and by a 180-degree horizontal rotation to position the second set of parallel rods 416 at the unloading position M2, N2, or O2 to unload the second container.

The unloading sequence then continues, to pack the bin 103 with a rear row 474 of containers at unloading points P1, P2, Q1, and Q2, and with a front row 470 of containers at unloading points R1, R2, S1, and S2. In the front and rear rows 470 and 474, the containers 201 are oriented end-to-end, rather than side-to-side as in the middle rows 472. The parallel rods 416 that carry containers 201 into rows 470 and 474 are therefore rotated an additional 90 degrees in a horizontal plane above the bin 103 prior to dropping the containers. When a container is dropped at unloading point S2, the lower layer of the stack is completed.

The unloading sequence then continues to create the next or higher layer in the stack. The unloading sequence for the higher layer is similar to the unloading sequence for the lower layer, except that the position of the unloading points for the higher layer are offset from the unloading points for the lower layer. The unloading points for the higher layer are indicated by the squares. The higher layer sequence begins at unloading points a1 and a2, where the loading areas 464, 466 of the tool 400 are moved to drop containers 201 from the two sets of parallel rods 416. The container 201 dropped at a1 falls onto spacing 476 between A1 and A2, and the container 201 dropped at a2 falls onto spacing 476 between A2 and G1. The stack now has two lower adjacent filled deformable containers 201 at A1 and A2 separated by a spacing 476, with an upper filled deformable container 201 at a1 centered approximately onto the spacing. Likewise, the stack has two lower adjacent filled deformable containers 201 at A2 and G1 separated by a spacing 476, with an upper filled deformable container 201 at a2 centered approximately onto the spacing. The unloading sequence for the higher layer continues as indicated, causing tool 400 to drop containers onto each spacing 476 between adjacent containers on the lower layer. The deformable property of each container 201 allows a portion of each higher level container to merge or settle into the offset spacing between adjacent lower level containers. By exploiting this property, a tool according to the invention can automatically assemble a stack of multiple overlapping rows of offset sacks into bulk bins in a spatially efficient manner that ensures even distribution of weight throughout the bin.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically loading into a bin an object conveyed along horizontal rollers, the system comprising:
    a movable support structure having a coupling end configured for attachment to a motive force, and having a lifting end supporting a plurality of parallel rods;
    means for positioning the plurality of parallel rods between and parallel to the horizontal rollers;
    means for raising the parallel rods when the object is conveyed to a loading position above the parallel rods;
    means for moving the parallel rods horizontally to a predetermined position above the bin; and
    means for rotating the parallel rods about a horizontal axis through a predetermined angle to allow the object to slide downward along the parallel rods and into the bin under force of gravity;
    wherein the rotating means comprises an axle coupled to two or more of the parallel rods.

2. The system of claim 1 wherein the plurality of parallel rods are configured to raise a filled deformable container being conveyed along the horizontal rollers.

3. The system of claim 1 further comprising a programmable controller configured to actuate one or more of the means.

4. The system of claim 3 wherein the programmable logic controller is configured to cause actuation of each of the means in a sequence, the sequence repeated a number of times to load into the bin a plurality of objects, such that each time the moving means is actuated, the parallel rods are moved to a subsequent predetermined position above the bin, wherein each subsequent predetermined position is offset from an immediately previous predetermined position to create spacing between adjacent objects that slide into the bin.

5. The system of claim 1 wherein the positioning means comprises the motive force.

6. The system of claim 1 wherein the rotating means comprises one or more pneumatic cylinders.

7. The system of claim 1 further comprising means for rotating the parallel rods within a horizontal plane about a vertical axis.

8. A system for automatically loading into a bin an object conveyed along horizontal rollers, the system comprising:
    a movable support structure having a coupling end configured for attachment to a motive force, and having a lifting end supporting a plurality of parallel rods;
    means for positioning the plurality of parallel rods between and parallel to the horizontal rollers;
    means for raising the parallel rods when the object is conveyed to a loading position above the parallel rods;
    means for moving the parallel rods horizontally to a predetermined position above the bin; and
    means for rotating the parallel rods about a horizontal axis through a predetermined angle to allow the object to slide downward along the parallel rods and into the bin under force of gravity; and
    one or more guide plates extending between the moveable support structure and the parallel rods.

9. The system of claim 8 wherein the one or more guide plates comprise a static guide plate and a hinged guide plate.

10. The system of claim 8 wherein the one or more guide plates includes a corrugated lower edge.

11. The system of claim 10 wherein spacing between corrugations of the corrugated lower edge correspond to spacing between the horizontal rollers.

\* \* \* \* \*